(12) United States Patent
Castleman (10) Patent No.: US 11,977,244 B2
(45) Date of Patent: May 7, 2024

(54) METHOD AND SYSTEM FOR GENERATING A VISUAL REPRESENTATION OF A REAL-WORLD OBJECT IN THREE PHYSICAL DIMENSIONS

(71) Applicant: Sony Interactive Entertainment Inc., Tokyo (JP)

(72) Inventor: Dennis D. Castleman, Fremont, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/733,980

(22) Filed: Apr. 29, 2022

(65) Prior Publication Data

US 2023/0350222 A1 Nov. 2, 2023

(51) Int. Cl.
*G02B 30/54* (2020.01)
*G09G 3/00* (2006.01)
*H04N 13/393* (2018.01)

(52) U.S. Cl.
CPC ............ *G02B 30/54* (2020.01); *G09G 3/003* (2013.01); *G09G 3/005* (2013.01); *H04N 13/393* (2018.05)

(58) Field of Classification Search
CPC ........ G02B 30/54; G09G 3/003; G09G 3/005; H04N 13/393
See application file for complete search history.

(56) References Cited

U.S. PATENT DOCUMENTS

| | | | |
|---|---|---|---|
| 4,983,031 | A | 1/1991 | Solomon |
| 5,148,310 | A | 9/1992 | Batchko |
| 5,537,251 | A | 7/1996 | Shimada |
| 5,815,314 | A | 9/1998 | Sudo |
| 6,183,088 | B1 | 2/2001 | Lore |
| 7,138,997 | B2 | 11/2006 | Balakrishnan |

(Continued)

FOREIGN PATENT DOCUMENTS

WO 2023212064 11/2023

OTHER PUBLICATIONS

Brown, Sean; "5 Benefits of Transparent OLED Screen Technology"; Pro Display; https://prodisplay.com/news/5-benefits-transparent-oled-screen/; Sep. 26, 2019; pp. 1-3.

(Continued)

*Primary Examiner* — Amy Onyekaba
*Assistant Examiner* — Cory A Almeida
(74) *Attorney, Agent, or Firm* — Fitch, Even, Tabin & Flannery LLP (57) ABSTRACT

A method includes capturing a plurality of different views of a real-world object with a plurality of image capture devices, and generating a visual representation of the real-world object in three physical dimensions by displaying images on a transparent display device that continuously rotates completely around an axis of rotation. The images displayed on the transparent display device are selected based on the plurality of different views of the real-world object. A system includes a plurality of image capture devices arranged to capture a plurality of different views of a real-world object, a transparent display device configured to continuously rotate completely around an axis of rotation, and a processor based apparatus. A storage medium storing one or more computer programs is also provided.

20 Claims, 6 Drawing Sheets

(56) References Cited

U.S. PATENT DOCUMENTS

| | | | |
|---|---|---|---|
| 7,324,085 | B2 | 1/2008 | Balakrishnan |
| 7,490,941 | B2 | 2/2009 | Mintz |
| 7,520,615 | B2 | 4/2009 | Hoshino |
| 7,554,541 | B2 | 6/2009 | Fitzmaurice |
| 7,583,252 | B2 | 9/2009 | Kurtenbach |
| 7,771,054 | B2 | 8/2010 | Otsuka |
| 7,961,182 | B2 | 6/2011 | Tachi |
| 8,233,032 | B2 | 7/2012 | Yukich |
| 8,253,652 | B2 | 8/2012 | Koo |
| 9,159,255 | B2 | 10/2015 | Watanabe |
| 9,470,899 | B2 | 10/2016 | Yoneno |
| 9,479,768 | B2 | 10/2016 | Yukich |
| 9,736,440 | B2 | 8/2017 | Chen |
| 9,964,773 | B2 | 5/2018 | Wang |
| 10,536,690 | B2 | 1/2020 | Kaehler |
| 10,585,393 | B2 | 3/2020 | Kim |
| 10,645,377 | B2 | 5/2020 | Ji |
| 10,761,344 | B1 | 9/2020 | Schmalenberg |
| 11,650,418 | B2 | 5/2023 | Lu |
| 2003/0142144 | A1 | 7/2003 | Balakrishnan |
| 2004/0001075 | A1 | 1/2004 | Balakrishnan |
| 2004/0001111 | A1 | 1/2004 | Fitzmaurice |
| 2004/0207599 | A1 | 10/2004 | Kurtenbach |
| 2005/0035962 | A1* | 2/2005 | Ishibashi ............... G09G 3/003 345/110 |
| 2005/0050778 | A1 | 3/2005 | Kim |
| 2006/0152435 | A1* | 7/2006 | Kondo ............... G03B 21/28 348/E5.143 |
| 2006/0171008 | A1 | 8/2006 | Mintz |
| 2006/0273983 | A1 | 12/2006 | Koo |
| 2007/0064201 | A1 | 3/2007 | Hoshino |
| 2008/0036969 | A1 | 2/2008 | Otsuka |
| 2008/0043014 | A1 | 2/2008 | Tachi |
| 2009/0303313 | A1 | 12/2009 | Yukich |
| 2012/0062988 | A1 | 3/2012 | Watanabe |
| 2012/0139897 | A1 | 6/2012 | Butler |
| 2012/0293632 | A1 | 11/2012 | Yukich |
| 2015/0042653 | A1 | 2/2015 | Takaki |
| 2015/0362742 | A1 | 12/2015 | Yoneno |
| 2016/0033780 | A1 | 2/2016 | Wang |
| 2016/0353071 | A1 | 12/2016 | Chen |
| 2017/0060088 | A1 | 3/2017 | Kim |
| 2017/0223344 | A1 | 8/2017 | Kaehler |
| 2018/0192043 | A1 | 7/2018 | Ji |
| 2020/0257126 | A1 | 8/2020 | Schmalenberg |
| 2021/0096392 | A1* | 4/2021 | Huang ............... H04N 13/393 |
| 2022/0334385 | A1 | 10/2022 | Lu |
| 2022/0334405 | A1 | 10/2022 | Iliffe-Moon |
| 2023/0350223 | A1 | 11/2023 | Castleman |

OTHER PUBLICATIONS

Conrad, David; "Beyond Holograms-Volumetric Images Using Optical Trap Display"; I Programmer; https://www.i-programmer.info/news/144-graphics-and-games/11506-beyond-holograms-volumetric-images-using-optical-trap-display.html; Jan. 28, 2018; 5 Pages.
Hermann, Carsten; "Transparent Displays explained"; MMT GmbH & Co.; https://www.mmt.io/transparent-lcd-news/transparent-displays-explained-part-1/; Aug. 4, 2015; pp. 1-4.
Geng, Jason; "Three-dimensional display technologies"; IEEE Intelligent Transportation Systems Society; Doc. ID 188297; Advances in Optics and Photonics vol. 5, Issue 4; doi:10.1364/AOP.5.000456; http://dx.doi.org/10.1364/AOP.5.000456; published Nov. 22, 2013; pp. 456-535.
Wikipedia; "Display device"; https://en.wikipedia.org/wiki/Display_device; printed on Oct. 19, 2022; pp. 1-4.
Wikipedia; "Holographic display"; https://en.wikipedia.org/wiki/Holographic_display; printed on Oct. 19, 2022; pp. 1-4.
Wikipedia; "microLED"; https://en.wikipedia.org/wiki/MicroLED; printed on Oct. 20, 2022; pp. 1-10.
Wikipedia; "OLED"; https://en.wikipedia.org/wiki/OLED; printed on Oct. 20, 2022; pp. 1-41.
Wikipedia; "Persistence of vision"; https://en.wikipedia.org/wiki/Persistence_of_vision; printed on Oct. 20, 2022; pp. 1-11.
Japan Display Inc.; "Transparent Display"; https://www.j-display.com/english/product/transparent_display.html; printed on Oct. 20, 2022; pp. 1-5.
Wikipedia; "See-through display"; https://en.wikipedia.org/wiki/See-through_display; printed on Oct. 20, 2022; pp. 1-7.
Wikipedia; "Volumetric display"; https://en.wikipedia.org/wiki/Volumetric_display; printed on Oct. 20, 2022; pp. 1-8.
Wang, Brian; "Volumetric Display achieves quality moving 3D images that are better than holograms"; Next Big Future; https://www.nextbigfuture.com/2018/01/volumetric-display-achieves-quality-moving-3d-images-that-are-better-than-holograms.html; Jan. 25, 2018; pp. 1-8.
USPTO; Non-Final Office Action issued in U.S. Appl. No. 17/733,981, dated Nov. 8, 2022, 21 pages.
USPTO; Final Office Action issued in U.S. Appl. No. 17/733,981, dated Apr. 14, 2023, 22 pages.
Patent Cooperation Treaty; Notification of Transmittal of the International Search Report and the Written Opinion of the International Searching Authority issued in PCT Application No. PCT/US2023/020002, dated May 23, 2023; 1 page.
Patent Cooperation Treaty; International Search Report issued in PCT Application No. PCT/US2023/020002, dated May 23, 2023; 2 pages.
Patent Cooperation Treaty; Written Opinion of the International Searching Authority issued in PCT Application No. PCT/US2023/020002, dated May 23, 2023; 10 pages.
USPTO; Advisory Action issued in U.S. Appl. No. 17/733,981, dated Jul. 26, 2023, 3 pages.
USPTO; Non-Final Office Action issued in U.S. Appl. No. 17/733,981, dated Aug. 18, 2023, 24 pages.
USPTO; Final Office Action issued in U.S. Appl. No. 17/733,981, mailed Jan. 11, 2024, 24 pages.

* cited by examiner

METHOD AND SYSTEM FOR GENERATING A VISUAL REPRESENTATION OF A REAL-WORLD OBJECT IN THREE PHYSICAL DIMENSIONS

CROSS-REFERENCE TO RELATED APPLICATIONS

This application is related to U.S. patent application Ser. No. 17/733,981, filed on the same date as this application, entitled "APPARATUS AND METHOD FOR A VOLUMETRIC DISPLAY," by inventor Dennis D. Castleman, the entire disclosure of which is hereby fully incorporated by reference herein in its entirety.

BACKGROUND OF THE INVENTION

1. Field of the Invention

Embodiments of the present invention relate generally to computer output device technologies, and more specifically to visual display device technologies.

2. Discussion of the Related Art

A display device is an output device for presentation of information in visual form. There are several different types of computer display technologies currently in use, such as for example, liquid crystal display (LCD), light-emitting diode display (LED), plasma display panel (PDP), cathode ray tube display (CRT), and others. Most display devices currently in use are limited to displaying two-dimensional (2D) images.

SUMMARY OF THE INVENTION

One embodiment provides a method, comprising: capturing a plurality of different views of a real-world object with a plurality of image capture devices; and generating a visual representation of the real-world object in three physical dimensions by displaying images on a transparent display device that continuously rotates completely around an axis of rotation; wherein the images displayed on the transparent display device are selected based on the plurality of different views of the real-world object.

Another embodiment provides a system, comprising: a plurality of image capture devices arranged to capture a plurality of different views of a real-world object; a transparent display device configured to continuously rotate completely around an axis of rotation; and a processor based apparatus configured to generate a visual representation of the real-world object in three physical dimensions by displaying images on the transparent display device as it rotates, wherein the images displayed on the transparent display device are selected based on the plurality of different views of the real-world object.

Another embodiment provides a non-transitory computer readable storage medium storing one or more computer programs configured to cause a processor based system to execute steps comprising: receiving data representing a plurality of different views of a real-world object that are captured with a plurality of image capture devices; and generating a visual representation of the real-world object in three physical dimensions by displaying images on a transparent display device that continuously rotates completely around an axis of rotation; wherein the images displayed on the transparent display device are selected based on the plurality of different views of the real-world object.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Several different types of computer display technologies were mentioned above. Another type of computer display technology is organic light-emitting diode (OLED) technology. This technology has recently been used to make transparent display devices, also known as see-through display devices. Transparent display devices allow the viewer to see what is shown on the screen while also allowing the viewer to see through the display device itself. They display RGB color, but no black is displayed because, given they are transparent, there is no solid black background. As such, transparent displays provide a source generated light but not a reflective light. While many current transparent display devices are based on OLED technology, other technologies may be used, such as for example MicroLED (microscopic LEDs), LCD, LED, and others. Various different types of transparent display devices provide various different levels of transparency. But most transparent display devices can be said to be at least partially transparent.

As mentioned above, most display devices currently in use are limited to displaying two-dimensional (2D) images. A volumetric display device is a graphic display device that forms a visual representation of an object in three physical dimensions. That is, a volumetric display device is capable of creating a three-dimensional (3D) image in space.

In some embodiments of the present invention, a transparent display device, such as a transparent OLED display, is used to make a volumetric display. For example, in some embodiments, a transparent display device is mounted to a motor and then rotated. As is described herein, this creates a volumetric display that achieves a 3D effect through persistence of vision.

Figure 1:
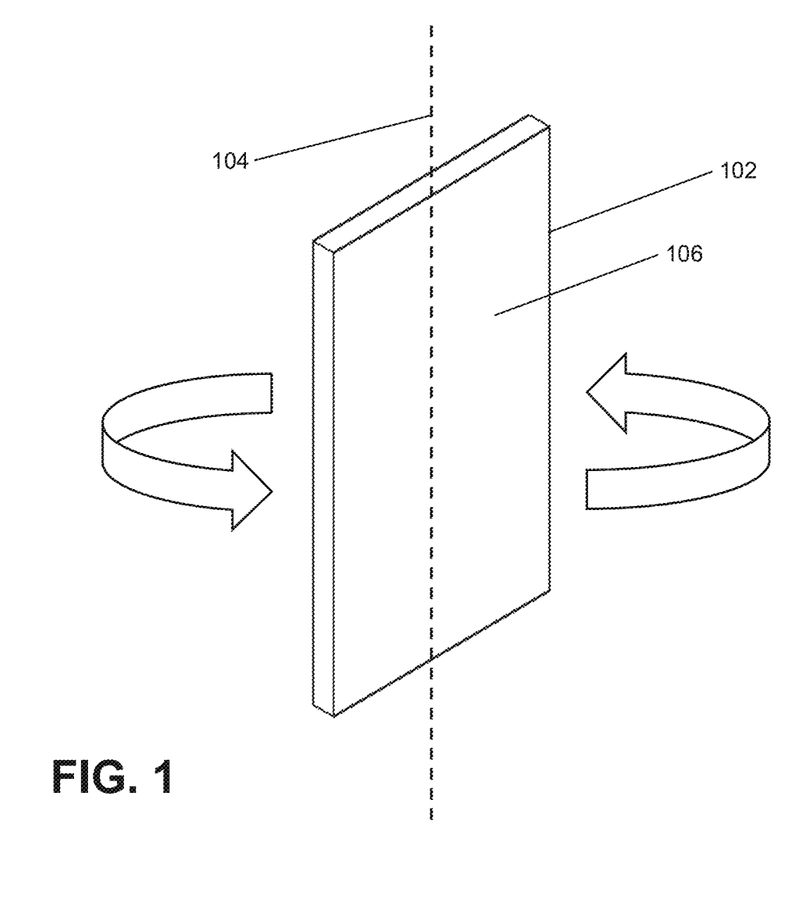
FIG. 1 is a diagram illustrating a transparent display device operating in accordance with some embodiments of the present invention.

FIG. 1 illustrates an example of a transparent display device 102 being rotated in accordance with an embodiment of the present invention. In this example the transparent display device 102 is rotated around an axis of rotation 104. The display device 102 rotates completely and continuously around the axis of rotation 104. That is, the display device 102 rotates a full 360 degrees around the axis of rotation 104 continuously in one direction. In some embodiments, the display device 102 is rotated at a constant rate. And in some embodiments, the display device 102 is rotated at a variable rate. The display device 102 is shown as rotating in the counterclockwise direction, but it should be understood that in some embodiments the display device 102 may instead rotate in the clockwise direction.

The display device 102 includes a display surface 106 on which the images are displayed. In the illustrated embodiment, the axis of rotation 104 either lies on the same plane as the display surface 106, or the axis of rotation 104 is parallel to the display surface 106. In the latter case, given that the display device 102 will typically have some thickness, the axis of rotation 104 may be somewhat offset from the plane of the display surface 106. More specifically, the display device 102 is typically very thin but still comprises a small thickness. The precise positioning of the axis of rotation 104 may take into consideration factors such as rotational balancing, etc. This may result in the axis of rotation 104 lying on the same plane as the display surface 106 in some embodiments, or the axis of rotation 104 being offset from that plane and being parallel to the display surface 106 in some embodiments. It should be well understood, however, that many other positions and placements of the axis of rotation 104 are possible in accordance with some embodiments of the present invention.

In accordance with some embodiments of the present invention, when images are displayed on the rotating transparent display device 102, a 3D image is created through persistence of vision. This occurs at least in part because the transparent nature of the display device 102, along with the light from the pixels of the rotating display device, provide for the visual perception of a 3D image. The 3D image is semitranslucent because the color black cannot be actively generated with an LED. In some embodiments, the created 3D image is similar to a hologram. Thus, in some embodiments, the apparatuses and methods described herein may be considered as providing a persistence of vision holographic display.

Figure 2:
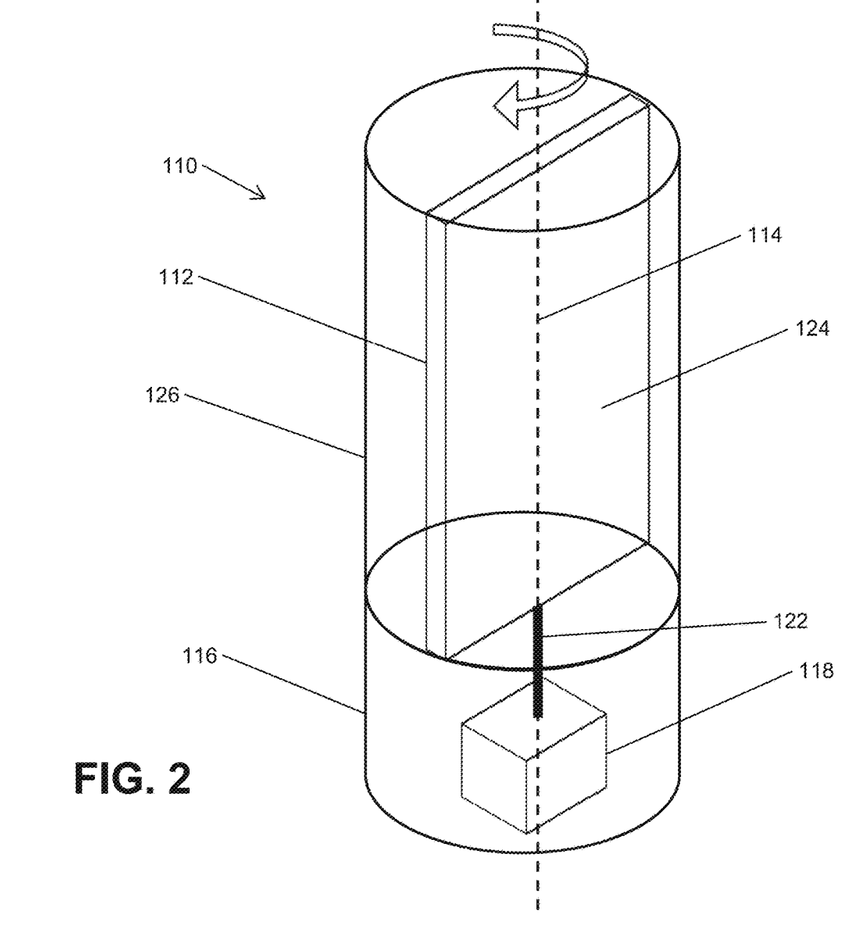
FIG. 2 is a diagram illustrating an apparatus that operates in accordance with some embodiments of the present invention.

FIG. 2 illustrates an apparatus 110 that may be used for implementing a volumetric display in accordance with an embodiment of the present invention. The apparatus 110 includes a display device 112 that is at least partially transparent and that is capable of displaying images. The display device 112 may comprise a transparent OLED display or any other type of transparent or partially transparent display. Furthermore, in some embodiments, the display device 112 may comprise an available off-the-shelf transparent display and/or any other conventional and/or available transparent display. Large format transparent OLED displays and other types of transparent displays are believed to be available. However, the display device 112 is not limited to any standard current form factors of displays or any currently available displays. In some embodiments, the display device 112 may comprise a custom, unique, and/or specially built transparent display having any size, shape, form factor, etc.

As illustrated, the display device 112 is rectangular in shape and is mounted in the portrait position. But the display device 112 may be mounted in the landscape position or any other position. And again, the display device 112 may comprise a display device having any shape, form factor, size, etc. For example, in some embodiments, the display device 112 may comprise a curved display device having any size.

In some embodiments, the display device 112 rotates completely around an axis of rotation 114 as described above. A mount 116 is configured to support the display device 112 and to facilitate continuous 360 degree rotation of the display device 112 around the axis of rotation 114. A motion producing device 118, such as a motor, is associated with the mount 116 and is configured to rotate the display device 112 around the axis of rotation 114. As mentioned above, in some embodiments, the display device 112 is rotated around the axis of rotation 114 at a constant rate. And in some embodiments, the display device 112 is rotated around the axis of rotation 114 at a variable rate. It is believed that a constant rate of rotation may provide a more stable 3D image, and a variable rate of rotation may provide a 3D image that changes or fluctuates in some way. The display device 112 is shown as rotating in the clockwise direction, but it should be understood that in some embodiments the display device 112 may instead rotate in the counterclockwise direction.

A shaft 122 or the like connects the motion producing device 118 to the display device 112 for driving the rotation. In some embodiments, a sensing device or means (discussed below) is included in the apparatus 110 for sensing, detecting, and/or monitoring the current position of the display device 112 within the 360 degree rotation.

The display device 112 includes a display surface 124 on which the images are displayed. In some embodiments, the axis of rotation 114 is positioned substantially parallel to at least a portion of the display surface 124. In some embodiments, the axis of rotation 114 is positioned such that it lies on the display surface 124, i.e. lies on the same plane as the display surface 124.

It was mentioned above that the precise positioning of the axis of rotation 104 (FIG. 1) may take into consideration factors such as rotational balancing, etc. Similarly, in some embodiments, the precise positioning of the axis of rotation 114 (FIG. 2) may take into consideration factors such as rotational balancing, etc. Furthermore, in some embodiments, the display device 112 is balanced so there is no vibration during rotation. That is, similar to a propeller or an automobile wheel/tire, balancing may be employed to help reduce or avoid vibration. Such balancing may be achieved by any suitable method or means. For example, in some embodiments, a balancer mechanism may be included that is configured to help reduce vibration as the display device 112 rotates. In some embodiments, such balancer mechanism may be coupled to the rotational shaft 122 or to another element of a rotational housing to establish balance under rotation. In some embodiments, such balancer mechanism may provide a counterbalance so the display device 112 does not, for example, act as an eccentric mass haptic and cause jitter on the display output. In some embodiments, such balancer mechanism may comprise or provide any other suitable balancing technique.

In some embodiments, an enclosure 126 that is at least partially transparent encloses the display device 112 without obstructing its rotation. The enclosure 126, which remains stationary, prevents the rotation of the display device 112 from being obstructed or interfered with, e.g. prevents a person from touching it. That is, with the display device 112 enclosed inside the stationary transparent enclosure 126, the display device 112 can be spinning inside the enclosure, be visible to a viewer, and the viewer can touch the enclosure without getting hit by the rotating display device 112.

In some embodiments, the enclosure 126 may be constructed from plexiglass, polycarbonate, or any other transparent plastic or glass, which allows the display device 112 to be visible. In some embodiments, the enclosure 126 is highly transparent to provide for maximum visibility of the images displayed on the display device 112. The enclosure 126 is illustrated as being cylindrical in shape, but the enclosure 126 may comprise any suitable shape.

In some embodiments, the enclosure 126 is configured to enclose the display device 112 within a vacuum. Drawing a vacuum on the enclosure 126 will reduce the atmospheric friction and air resistance of the rotating display device 112 to facilitate more efficient rotation.

In some embodiments, power is supplied to the rotating display device 112 by way of a slip-ring type power delivery device. Such devices typically include a ring with multiple tracks in it, and then the portion that is spinning includes brushes that make contact with the track for power delivery. But other power delivery techniques may be used. In some embodiments, the image and/or video data signals are provided to the rotating display device 112 by way of wireless communications. For example, in some embodiments a 5G modem is used for such communications and may even be mounted to the display driver board for getting the image/video data into the display. But other data delivery techniques may be used.

Figure 3:
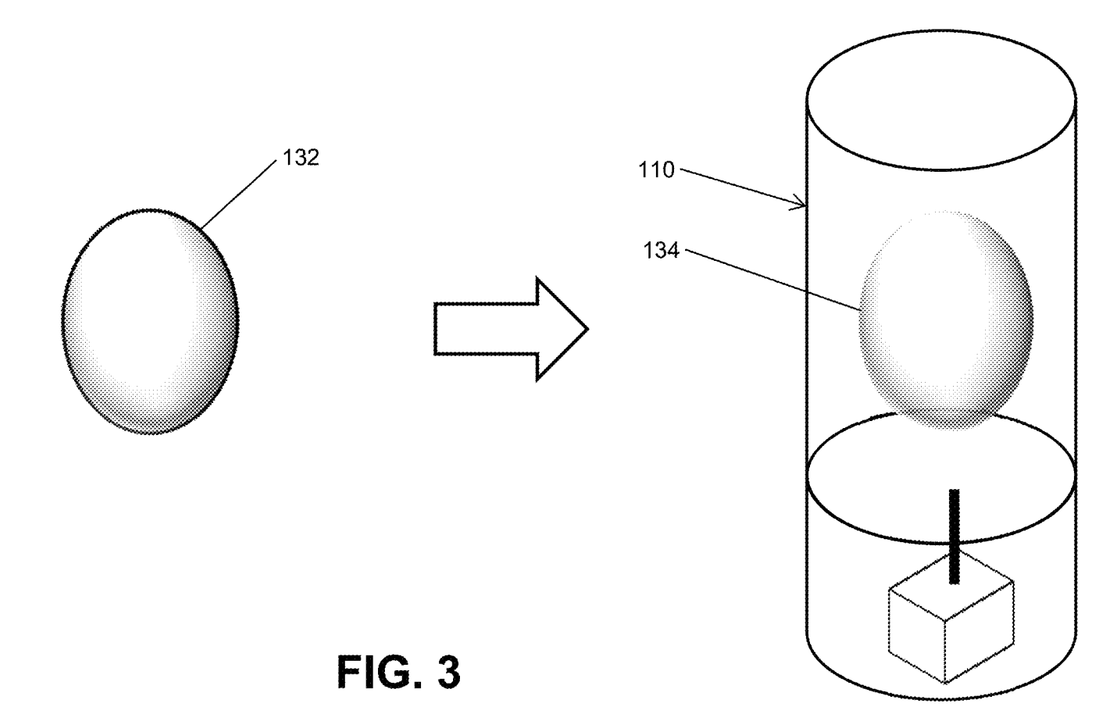
FIG. 3 is a diagram illustrating an apparatus operating in accordance with some embodiments of the present invention.

FIG. 3 illustrates the operation of the apparatus 110 in implementing a volumetric display in accordance with an embodiment of the present invention. Specifically, a 3D object, such as an egg 132, is to be displayed. The egg 132 may be an actual real-world egg, or it may be a virtual egg for which a 3D model has been rendered.

Referring to both FIGS. 2 and 3, in some embodiments, in order to display the egg 132, the transparent display device 112 is continuously rotated in one direction completely around (i.e. 360 degrees) the axis of rotation 114. In some embodiments, such rotation may be at a constant rate. In some embodiments, such rotation may be at a variable rate. In FIG. 3 the transparent display device 112 inside the apparatus 110 is not shown because it is rotating, and given that it is substantially transparent, it is not clearly visible.

As the transparent display device 112 rotates, images are selected and displayed on the display device 112 in a manner that generates a visual representation 134 of the egg 132 in three physical dimensions. The visual representation 134 of the egg 132 comprises a full 360 degree viewing angle. That is, a viewer can see the visual representation 134 from all sides. This is an advantage over many 3D display devices which have a limited viewing angle. With such devices a viewer cannot see anything if the viewer moves far enough to one side beyond the limited viewing angle.

In some embodiments, the visual representation 134, which exists in three physical dimensions, is similar to a hologram. As mentioned above, in some embodiments, the apparatuses and methods described herein may be considered as providing a persistence of vision holographic display.

In some embodiments, the images that are displayed on the display device 112 to generate the visual representation 134 of the egg 132 in three physical dimensions are selected from a plurality of views of the egg 132. That is, the images are selected from a plurality of actual views of the object for which the visual representation is generated. For real-world objects the views may be generated by cameras or other image capture devices, and for virtual objects the views may be generated by software from a rendered 3D model. This technique will be thoroughly discussed below.

In contrast, in some embodiments, a visual representation of an object in three physical dimensions may be generated by displaying images other than actual views of the object. For example, in some embodiments, the visual representation 134 of the egg 132 may be generated by displaying a 2D oval shape on the display device 112 at all positions of the display device 112 in the full 360 degree rotation. That is, the image that is selected and displayed on the display device 112 is a 2D oval shape, and the image does not change as the display device rotates. The visual representation 134 of the egg 132 is generated because, as the display device 112 rotates, the viewer's persistence of vision causes the 2D oval to appear to be a 3D egg.

As another example, if the egg 132 were sliced in half vertically, a visual representation of one-half of the egg 132 could be generated by displaying one-half of a 2D oval shape on one side of the display screen of the display device 112 for 180 degrees of each rotation, and leaving the entire display screen blank for the other 180 degrees of each rotation. Or, the visual representation could be generated by alternating between displaying one-half of a 2D oval shape on one side of the display screen, and then displaying one-half of a 2D oval shape on the other side of the display screen, during the same 180 degrees of each rotation.

As additional examples, a visual representation of a ring shape could be generated by lighting one pixel at the edge of the display screen of the display device 112, or by also lighting the corresponding pixel at the opposite edge of the display screen. As these one or two lit pixels spin they create a ring shape through persistence of vision. A visual representation of a cylinder could be generated by lighting several consecutive pixels to form a vertical line at either or both edges of the display screen. And a visual representation of one-half of that cylinder could be generated by turning those pixels off for one-half of the rotation (i.e. 180 degrees) of the display device 112.

As the above examples illustrate, there is often more than one way to generate a visual representation of a 3D object in three physical dimensions with the apparatus 110. That is, there is often different combinations and timing of images that can be displayed on the display device 112 to generate a visual representation in three physical dimensions of the same 3D object.

In some embodiments, no matter what images are to be displayed on the display device 112 to generate a visual representation of an object in three physical dimensions, it will often be the case that the images displayed on the display device 112 will need to be changed, modified, and/or updated during the rotation of the display device 112 in order to generate the visual representation. In some embodiments, the images displayed on the display device 112 will need to be changed, modified, and/or updated many times and/or frequently during the rotation of the display device. Thus, in some embodiments, in order to generate a visual representation of an object, the system (example discussed below) driving the apparatus 110 needs to know when and what pixels on the display device 112 to turn on at what point in the rotation. That is, the system needs to know at what points in the rotation do certain pixels get turned on.

In order to illustrate the changing, modification, and/or updating of the displayed images during the rotation of the display device 112, reference will be made to FIG. 4. FIG.

4 is a top view looking down on FIG. 3. That is, FIG. 4 is a top view looking down on the egg 132, the visual representation 134 of the egg 132, and the apparatus 110. Also shown is the display device 112, which is shown at one position in its rotation. The illustrated position of the display device 112 will be referred to as position A.

In some embodiments, there are predetermined positions of the display device 112 in its 360 degree rotation (i.e. within a complete revolution) that the displayed images will be changed, modified, and/or updated. More specifically, in some embodiments, in order to generate a visual representation of an object, such as the egg 132, an image will be selected and displayed on the display device 112 at each of a plurality of different positions of the display device 112 within the 360 degree rotation of the display device 112. For example, if the display device 112 rotates in the clockwise direction, an image will be selected and displayed on the display device 112 at position A, and then an image will be selected and displayed on the display device 112 at position B, and then an image will be selected and displayed on the display device 112 at position C, and then again at position D, and so on. In some embodiments, the plurality of different positions of the display device 112 within the rotation comprises a plurality of equally spaced apart positions. In some embodiments, the displayed image does not necessarily have to be changed, modified, and/or updated at each position if such is not needed. The displayed image could stay the same for more than one position.

In some embodiments, the number of different positions within the 360 degree rotation that the image displayed on the display device 112 can be changed, modified, and/or updated depends on the refresh rate of the display device 112 and the rate of rotation of the display device 112. This is because the image displayed on the display device 112 is changed, modified, and/or updated when the display device is refreshed, such as when a new image or video frame is displayed.

For example, if the refresh rate of the transparent display device 112 is 120 Hertz, and the display device 112 is rotated at a rate of 1 revolution per second, then the display device 112 can be refreshed 120 times within one 360 degree rotation, which means the display device 112 can be refreshed every 3 degrees. As such, in this example, there are 120 equally spaced positions within one 360 degree rotation that the image displayed on the display device 112 can be changed, modified, and/or updated. The 120 equally spaced positions are each spaced apart by 3 degrees. This means that each 3 degree increment in the rotation circle comprises one frame of the display during the course of the rotation.

As another example, if the refresh rate of the transparent display device 112 is 120 Hertz, and the display device 112 is rotated at a rate of 2 revolutions per second, then the display device 112 can be refreshed 60 times within one 360 degree rotation, which means the display device 112 can be refreshed every 6 degrees. As such, in this example, there are 60 equally spaced positions within one 360 degree rotation that the image displayed on the display device 112 can be changed, modified, and/or updated. The 60 equally spaced positions are each spaced apart by 6 degrees, which means that each 6 degree increment in the rotation circle comprises one frame of the display during in the course of the rotation.

As another example, if the refresh rate of the transparent display device 112 is 360 Hertz, and the display device 112 is rotated at a rate of 6 revolutions per second, then the display device 112 can be refreshed 60 times within one 360 degree rotation, which means the display device 112 can be refreshed every 6 degrees. As such, in this example, there are 60 equally spaced positions within one 360 degree rotation that the image displayed on the display device 112 can be changed, modified, and/or updated. The 60 equally spaced positions are each spaced apart by 6 degrees, which means that each 6 degree increment in the rotation circle is one frame of the display during in the course of the rotation.

The last of the above examples has the advantage of the fastest rate of rotation of the display device 112 at 6 revolutions per second. A faster rate of rotation of the display device 112 improves the persistence of vision of the volumetric display. However, in some embodiments, the rate of rotation should be balanced with the number of positions within one 360 degree rotation that the display device 112 can be refreshed. For any given refresh rate of the transparent display device 112, the faster the rate of rotation, the fewer times that the display device 112 can be refreshed within one rotation/revolution, which means the fewer positions within one 360 degree rotation that the display device 112 can be refreshed. Having a larger number of closely spaced refresh positions within one 360 degree rotation improves the ability to provide a higher level of detail in the generated visual representation of an object. This is at least partly because the image displayed on the display device 112 can be changed, modified, and/or updated a greater number of times within the rotation.

In some embodiments, for a 360 Hertz refresh rate of the display device 112, a rate of rotation of 6 revolutions per second, which provides for a display refresh every 6 degrees, is believed to be a good balance of rotational speed and opportunities for refresh. It provides 60 equally spaced refresh positions within one 360 degree rotation, which provides that each 6 degree increment in the rotation circle comprises one frame of the display during in the course of the rotation. Stated differently, it provides 60 frames within a 360 degree revolution with each frame covering 6 degrees of movement of the display device 112. That is, when the display device 112 moves 6 degrees, there is a new frame. When the display device 112 moves another 6 degrees, there is another new frame, and so on.

In some embodiments, if the display device 112 could refresh at a higher rate, then the size of the increments of movement for a new frame could be reduced without necessarily reducing the rate of rotation of the display device 112. For example, for very high refresh rates there could be a new frame for each 1 degree movement within the 360 degree rotation, or even more than one new frame per each 1 degree movement, depending upon the rate of rotation of the display device 112. Therefore, in some embodiments, higher refresh rates for the display device 112 are preferred because they can allow for faster rates of rotation and an increased number of refresh positions within one 360 degree rotation. It should be well understood, however, that any refresh rate, rate of rotation, and number of refresh positions may be used for the display device 112 in accordance with some embodiments of the present invention.

In some embodiments, in order for the system (example discussed below) driving the display device 112 to know when to change, modify, and/or update the image displayed on the display device 112, the current position of the display device within the 360 degree rotation is sensed, detected, and/or monitored. This way, as the display device 112 rotates the system knows the exact position of the display as it is spinning and will be able to detect when one of the refresh positions is encountered. When the sensed current position is equal to one of the plurality of different refresh positions, the image corresponding to that position is displayed. In some embodiments, the position sensing, detecting, and/or monitoring is performed continuously while the display device 112 rotates.

The sensing, detecting, and/or monitoring of the current position of the display device 112 may be performed with a sensing device configured to sense the position of the display device within a rotation. The sensing device may be associated with, or part of, the apparatus 110. There are many different types of mechanisms and sensors for detecting the position of a rotational object that may be used. For example, in some embodiments, a Hall effect sensor or an index wheel with an optical sensor may be used. Or, in some embodiments, a stepper motor may be used as the motion producing device 118 to rotate the display device 112 so that a very precise step corresponds to each of the predetermined refresh positions within the full 360 degree rotation.

As mentioned above, in some embodiments, the images that are displayed on the display device 112 to generate a visual representation of an object in three physical dimensions are selected from a plurality of actual views of the object for which the visual representation is generated. More specifically, in some embodiments, in order to generate a visual representation of an object in three physical dimensions, images are displayed on the rotating transparent display device 112. In some embodiments, for each of a plurality of different positions of the display device 112 within a rotation, an image is displayed on the display device 112. And in some embodiments, for each of the plurality of different positions of the display device 112 within the rotation, the image that is displayed is selected based on a plurality of views of the object for which the visual representation is generated.

In some embodiments, the plurality of different positions of the display device 112 within a rotation corresponds to the equally spaced positions or increments in the rotation circle at which the display device 112 can be refreshed. As discussed above, the number of such equally spaced positions or increments depends on the refresh rate of the display device 112 and the rate of rotation of the display device 112.

In some embodiments, when the display device 112 is refreshed at one of these positions or increments, the new image that is displayed is selected based on a plurality of actual views of the object for which the visual representation is generated.

As mentioned above, the egg 132 may be an actual real-world egg, or it may be a virtual egg for which a 3D model has been rendered. For the latter scenario in which a 3D model of the object has been rendered, a plurality of different views of the object can be created through software. For the former scenario in which the object is a real-world object, a plurality of different views of the object can be captured with one or more cameras or other image capture devices.

In some embodiments, the number of different actual views of the object that are used for selecting the new image that is to be displayed on the display device 112 at each of the refresh positions is the same as the number of equally spaced positions or increments in the rotation circle at which the display device 112 can be refreshed. For example, it was mentioned above that if the refresh rate of the transparent display device 112 is 360 Hertz, and the display device 112 is rotated at a rate of 6 revolutions per second, then the display device 112 can be refreshed 60 times within one 360 degree rotation, which means the display can be refreshed every 6 degrees. In this example there are 60 equally spaced positions or increments in the rotation circle at which the screen of the display device 112 can be refreshed. As such, in some embodiments, 60 different views of the object are used for selecting the particular image that is to be displayed on the display device 112 at each of the 60 refresh positions in order to generate the visual representation of the object in three physical dimensions. Therefore, in some embodiments, the number of refresh positions of the display device 112 is equal to the number of views of the object for which a visual representation is to be generated. That is, for each of the refresh positions of the display device 112, there is a corresponding view of the object for which a visual representation is to be generated.

Continuing with this example, in some embodiments, the 60 different views of the object are used as the actual images that are displayed on the display device 112. That is, for each of the 60 refresh positions in the rotation circle, the particular image that is selected and displayed on the display device 112 is the corresponding one of the 60 different views of the object. Thus, in some embodiments, for each of a plurality of different positions of the display device 112 within a rotation, the image that is selected and displayed on the display device 112 comprises the corresponding view of the object for which the visual representation is generated.

Continuing further with this example, in some embodiments, for any object for which a visual representation is to be generated, a 3D model of the object may be created in software. The 3D model is then sliced up like a pie into 60 slices (i.e. views), and each slice (i.e. view) gets displayed on the display device 112 during one of the 60 refresh positions in the rotation circle. More specifically, the 3D model is rendered based on the camera position. In this case the camera position changes according to the position of the screen. The camera position is changed 60 times to pre-render 60 different views, one for each refresh position in the rotation circle, which in this example is every 6 degrees. That is, 60 equally spaced different views of the object are created through software. The views of the object are preferably taken from the perspective of a circle around the object with the object at the center of the circle. This provides a view for each of the 60 different refresh positions in the rotation circle. Each of the 60 different views then gets displayed on the display device 112 during the corresponding one of the 60 refresh positions in the rotation circle. That is, each of the 60 different views is displayed at its particular point in the rotation.

Figure 4:
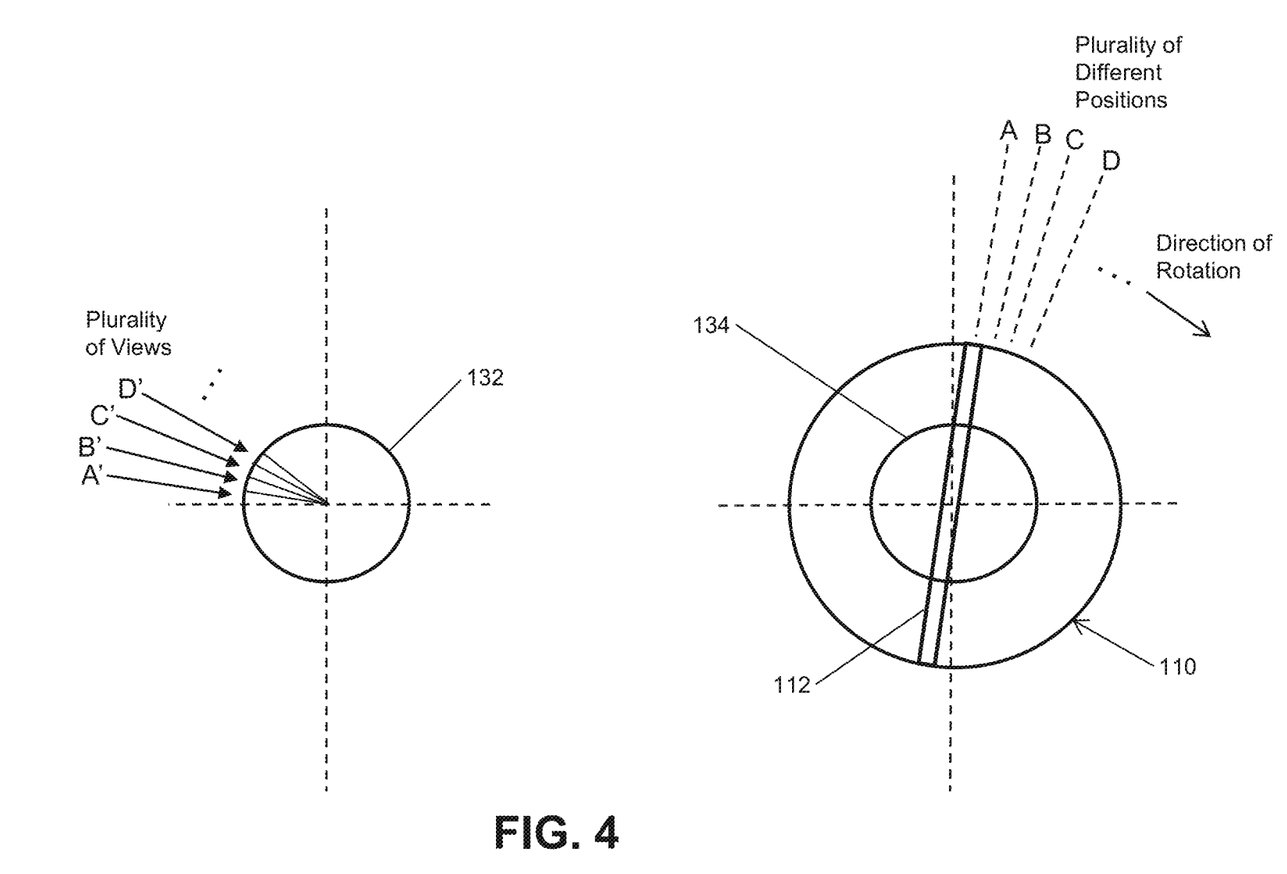
FIG. 4 is a top view of FIG. 3 illustrating the operation of an apparatus in accordance with some embodiments of the present invention.

FIG. 4 illustrates an example of the corresponding view of the object being selected and displayed on the display device 112 when the display device 112 is located at the corresponding refresh position. Specifically, in this example, a refresh rate and a rate of rotation of the transparent display device 112 in the apparatus 110 have been chosen to provide the plurality of different refresh positions A, B, C, D, and so on. As discussed above, if the display device 112 rotates in the clockwise direction, an image will be selected and displayed on the display device 112 when the display device 112 is located at position A, and then an image will be selected and displayed on the display device 112 when the display device 112 is located at position B, and then an image will be selected and displayed on the display device 112 when the display device 112 is located at position C, and then again at position D, and so on.

As is also shown in FIG. 4 (which is not to scale), the egg 132, which is the object for which a visual representation is to be generated, has been sliced up like a pie into a plurality of slices (i.e. views), namely view A', view B', view C', view D', and so on. If the egg 132 is a virtual egg for which a 3D model has been rendered, then the plurality of different views can be created through software. If the egg 132 is an actual real-world egg, then the plurality of different views can be captured with one or more cameras or other image capture devices.

The views A', B', C', D', and so on, respectively correspond to the display device 112 refresh positions A, B, C, D, and so on. That is, when the display device 112 is located at position A, the view of the visual representation 134 that will be displayed on the display device 112 corresponds to view A' of the egg 132. Similarly, when the display device 112 is located at position B, the view of the visual representation 134 that will be displayed on the display device 112 corresponds to view B' of the egg 132. And similarly, when the display device 112 is located at position C, the view of the visual representation 134 that will be displayed on the display device 112 corresponds to view C' of the egg 132. And the same for position D and view D', and so on.

Therefore, in some embodiments, when the display device 112 is located at position A, the image that will be selected and displayed on the display device 112 is view A' of the egg 132. Similarly, when the display device 112 is located at position B, the image that will be selected and displayed on the display device 112 is view B' of the egg 132. And similarly, when the display device 112 is located at position C, the image that will be selected and displayed on the display device 112 is view C' of the egg 132. And the same for position D and view D', and so on. In this way, in some embodiments, for each of the plurality of different refresh positions of the display device 112 within a rotation, the image that is selected and displayed on the display device 112 comprises the corresponding view of the object for which the visual representation is generated.

Therefore, in some embodiments, images are displayed on the display device 112 as it rotates in a manner that generates a visual representation of an object in three physical dimensions. For each of a plurality of different positions of the display device 112 within a rotation, an image is displayed on the display device 112 that comprises a corresponding view of the object for which the visual representation is generated. Or, in some embodiments, an image is displayed on the display device 112 that comprises a corresponding one of the plurality of different views of the object.

In some embodiments, this process may be used for any 3D object for which a visual representation is to be generated. The shape of the 3D object does not matter. The main objective is to display each view of the 3D object on the display device 112 at the corresponding refresh position in the rotation circle. A visual representation can be generated by the apparatus 110 for any shape 3D object by slicing up the 3D model as described herein. In some embodiments, if the 3D object for which a visual representation is to be generated comprises a real-world object, a 3D software model may be created for the object, or the plurality of equally spaced different views of the object may be captured with one or more cameras or other image capture devices.

It should be understood that, in some embodiments, the image that is selected and displayed on the display device 112 may not be the exact image of the corresponding view of the object for which the visual representation is generated. That is, in some embodiments, the image of the corresponding view of the object may be modified or altered in some minor or insignificant way prior to being displayed on the display device 112. Thus, in some embodiments, it is sufficient if the image that is selected and displayed on the display device 112 substantially comprises the corresponding view of the object for which the visual representation is generated.

It should also be understood that, in some embodiments, the number of refresh positions of the display device 112 does not have to be equal to the number of views of the object for which a visual representation is to be generated. That is, in some embodiments, the number of different actual views of the object that are used for selecting the new image can be different than the number of refresh positions of the display device 112. For example, if there are a greater number of refresh positions than views of the object, then in some embodiments, some of the refresh positions do not have to be used. That is, the display device 112 does not have to be refreshed at every refresh position. The system can utilize only the refresh positions for which it has enough views of the object. Or, in some embodiments, some or all of the views of the object can be re-used during the rotation circle of the display device 112 and displayed at more than one of the refresh positions. On the other hand, if there are a smaller number of refresh positions than views of the object, then in some embodiments, some of the views of the object can be skipped during the rotation circle of the display device 112 such that not all of the views get displayed.

Finally, in some embodiments, the plurality of views of the object are used to generate the particular image that is to be displayed on the display device 112 at each of the refresh positions in order to generate the visual representation of the object in three physical dimensions. That is, in some embodiments, the plurality of views of the object are not used as the actual images that are displayed on the display device 112. Stated differently, in some embodiments, when the display device 112 is located at a refresh position, the corresponding view of the object is not displayed on the display device 112. Instead, in some embodiments, the particular image that is to be displayed on the display device 112 at each refresh position is generated by using the plurality of views of the object for which the visual representation is to be generated. That is, in some embodiments, the plurality of views of the object are used to generate the particular image that is to be displayed on the display device 112 at each refresh position. In some embodiments, the generated image is considered to be an image that is selected based on a plurality of views of the object for which the visual representation is generated.

Figure 5:
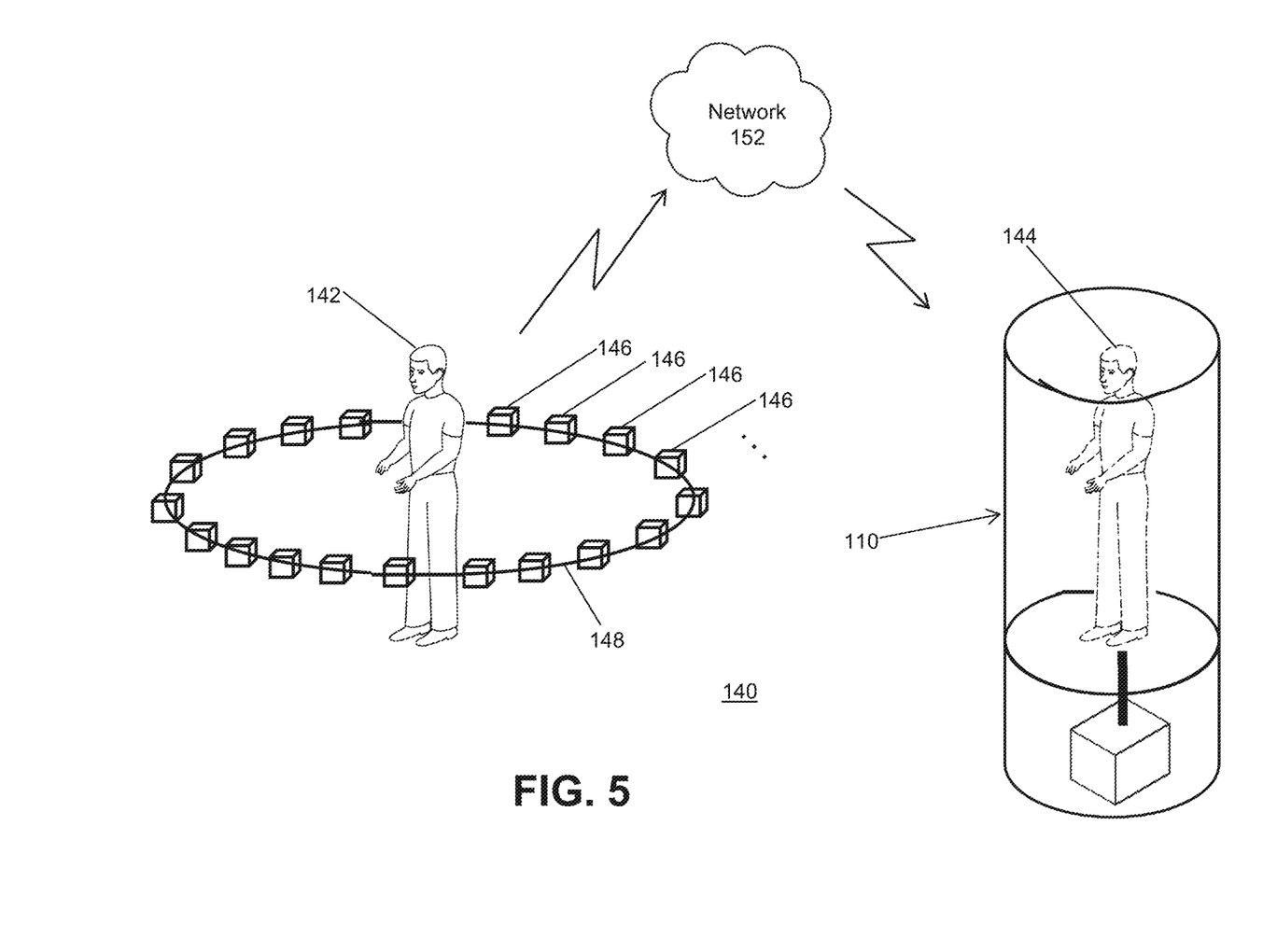
FIG. 5 is a diagram illustrating a system that operates in accordance with some embodiments of the present invention.

FIG. 5 illustrates a system 140 in accordance with another embodiment of the present invention. As shown, the apparatus 110 is used to generate a visual representation 144 of a human being 142 in three physical dimensions. Thus, in this example the 3D object for which a visual representation is to be generated comprises a real-world object, namely the human being 142.

This example illustrates that the transparent display device 112 in the apparatus 110 is not limited to any standard current form factors of displays. Therefore, in some embodiments, the transparent display device 112 can, for example, be on the order of 6 feet tall by 2.5 feet wide, which can create the life-size visual representation 144 of the human being 142. Furthermore, the visual representation 144 of the human being 142 comprises a full 360 degree viewing angle, which allows a viewer to walk all the way around it, and which is advantageous over 3D display devices that have a limited viewing angle.

Thus, in some embodiments, the visual representation 144 of the human being 142 provides a virtual person, virtual performer, virtual actor, etc., which viewers can view at very close distances (e.g. just inches) from all sides. In some embodiments, the visual representation 144 of the human being 142 can be programmed or controlled in real time to interact with viewers. For example, the visual representation 144 of the human being 142 can turn and talk to viewers as the viewers approach. This could be useful in museums or similar places where visual representations of famous or historical people could interact with viewers. In some embodiments, the visual representation 144, which exists in three physical dimensions, is similar to a hologram. Thus, in some embodiments, the visual representation 144 can be considered to be a holographic human being, and the apparatuses and methods described herein may be considered as providing a holographic display.

As shown, the system 140 includes a plurality of image capture devices 146 arranged to capture a plurality of different views of the real-world object, i.e. the human being 142. In some embodiments, the image capture devices 146 may comprises cameras or the like. In some embodiments, the plurality of image capture devices 146 are arranged to encircle the human being 142. And in some embodiments, the plurality of image capture devices 146 are equally spaced apart. And in some embodiments, the plurality of image capture devices 146 continuously capture a plurality of different views of the human being 142.

In the illustrated embodiment (which is not to scale), the plurality of image capture devices 146 are mounted to a ring 148 with the human being 142 located at the center of the ring 148. Each of the multiple image capture devices 146 mounted to the ring 148 around the circle represent a different point of view of the human being 142. In some embodiments, the total number of image capture devices 146 used may depend at least in part on the refresh rate and rate of rotation of the display device 112, similar to as described above.

Thus, in some embodiments, the plurality of image capture devices 146 are arranged and configured to capture a plurality of equally spaced views of the human being 142. The views are used as described above to generate the visual representation 144 of the human being 142 in three physical dimensions in the apparatus 110. As such, in some embodiments, the number of image capture devices 146 that are used to encircle the human being 142 will be the same as the number of equally spaced refresh positions in the rotation circle of the display device 112 in the apparatus 110. But similar to as mentioned above, in some embodiments, the number of image capture devices 146 does not have to be the same as the number of equally spaced refresh positions.

As described above, in some embodiments, the number of refresh positions within the rotation circle depends on the refresh rate of the display device 112 and the rate of rotation of the display device 112. By way of example, if the refresh rate of the display device 112 is 360 Hertz, and the display device 112 is rotated at a rate of 6 revolutions per second, there will be 60 equally spaced refresh positions in the rotation circle. As such, in some embodiments, 60 different views of the human being 142 will be needed, which means that 60 image capture devices 146 are used to capture the different views of the human being 142.

Continuing with this example, the ring 148 would have 60 image capture devices 146 mounted thereto with the human being 142 located at the center of the ring 148. In some embodiments, all of the image capture devices 146 are preferably synchronized with each other and continuously capture images. The image capture devices 146 are preferably synchronized because then the first frame from all of the image captures devices 146 will occur at the same time, and the second frame from all of the image captures devices 146 will occur at the same time, and the third frame from all of the image captures devices 146 will occur at the same time, and so on. This way, the 60 different views of the human being 142 will be synchronized so that at one moment in time each view will show what occurred at that moment.

Furthermore, in some embodiments, the image capture devices 146 are preferably synchronized with the rotation of the transparent display device 112 in the apparatus 110. Continuing with the above example, each of the image capture devices 146 would preferably have a frame rate of 360 frames per second to match the 360 Hertz refresh rate of the transparent display device 112. The image capture devices 146 are preferably synchronized with the rotation so that at each refresh position of the display device 112 in the apparatus 110, the latest frame from the corresponding image capture device 146 is available. For example, when the display device 112 is located at the first refresh position, the first frame from the first image capture device 146 is selected and displayed. When the display device 112 is located at the second refresh position, the second frame from the second image capture device 146 is selected and displayed. When the display device 112 is located at the third refresh position, the third frame from the third image capture device 146 is selected and displayed. And so on.

As will be discussed below, in some embodiments a processor based apparatus or system may be used to control the apparatus 110. In some embodiments, such processor based apparatus or system is configured to generate the visual representation 144 of the human being 142 in three physical dimensions by displaying images on the transparent display device 112 as it rotates. And similar to as described above, in some embodiments, the images displayed on the display device 112 are selected based on the plurality of different views of the human being 142 captured by the image capture devices 146. For example, in some embodiments, the processor based apparatus or system receives the frames for the plurality of different views of the human being 142 captured by the image capture devices 146. The processor based apparatus or system then selects the appropriate frames to be displayed on the display device 112.

In some embodiments, the visual representation 144 of the human being 142 is generated in substantially real time with the capturing of the plurality of different views of the human being 142. This has the effect of the visual representation 144 of the human being 142 being generated "live" with the performance, movements, and/or other actions of the human being 142. The "live" visual representation 144 of the human being 142 comprises a full 360 degree viewing angle. In some embodiments, this results from using the plurality of synchronized image capture devices 146 that encircle the human being 142 and that continuously capture the plurality of different views of the human being 142. Thus, a viewer can see the visual representation 144 from all sides and will be able to see all the movements and actions made by the human being 142 from all sides in real time.

In some embodiments, the "live" visual representation 144 of the human being 142 is transmitted to anywhere in the world in real time. For example, in some embodiments, data representing the plurality of different views of the human being 142 captured by the image capture devices 146 is transmitted via a computer network 152, such as the Internet, to the apparatus 110 for use in generating the visual representation 144 of the human being 142. The apparatus 110 may be located many miles away from the human being 142 and the image capture devices 146, possibly in a different part of the world.

Thus, transmitting the data over the network 152 in this way allows for the live generation of a visual representation of a performance that takes place many miles away. For example, a famous or noteworthy person could be giving a speech in one geographic location, and then in another geographic location many miles away a visual representation of that person in three physical dimensions could be generated in real time by the apparatus 110. Viewers would be able to stand or sit within inches of the visual representation of the person to hear and see the speech in real time and would be able to walk all the way around the visual representation to view the person from all sides.

In some embodiments, the methods, schemes, and techniques described herein may be utilized, implemented and/or run on many different types of processor based apparatuses or systems. For example, the methods, schemes, and techniques described herein may be utilized, implemented, and/or run in any type of communications systems or equipment, positional tracking systems, smartphones, game consoles, entertainment systems, portable devices, mobile devices, tablet devices, pad-like devices, computers, workstations, desktop computers, notebook computers, servers, etc. Furthermore, in some embodiments, the methods, schemes, and techniques described herein may be utilized, implemented and/or run in online scenarios, networked scenarios, over the Internet, etc.

Figure 6:
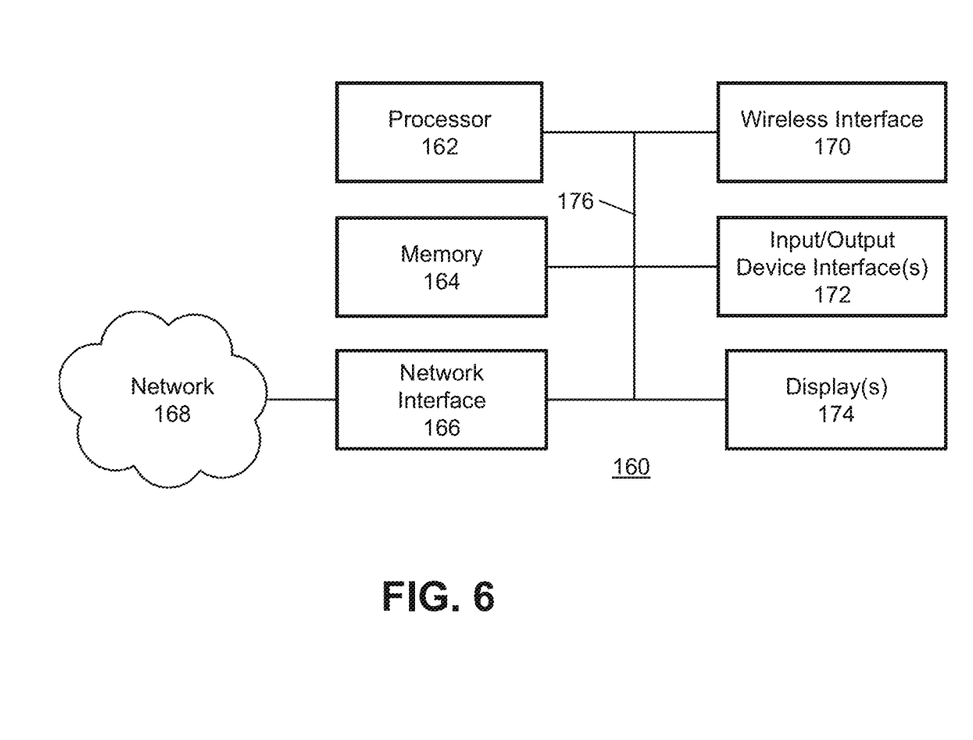
FIG. 6 is a block diagram illustrating a processor based apparatus/system that may be used to run, implement, and/or execute any of the methods, schemes, and techniques shown and described herein in accordance with some embodiments of the present invention.

Referring to FIG. 6, there is illustrated an example of a processor based system or apparatus 160 that may be used for any such implementations. The system or apparatus 160 may be used for implementing any method, scheme, technique, system, or device mentioned above. For example, in some embodiments, the system or apparatus 160 may be used for driving and/or controlling the apparatus 110 and thus the display device 112. As another example, in some embodiments, the system or apparatus 160 may be used for driving and/or controlling all or part of the system 140. However, the use of the system or apparatus 160 or any portion thereof is certainly not required.

By way of example, the processor based system 160 may include, but is not required to include, a processor 162 (e.g. a central processing unit (CPU)), a memory 164, a wireless and/or wired network interface 166, access to a network 168, one or more displays 174, one or more input/output device interfaces 172, and a wireless interface 170. One or more of these components may be collected together in one apparatus, device, or system, or the various components may be distributed across one or more different apparatuses, devices, or systems, or even distributed across one or more networks. In some embodiments, one or more of these components may be collected together in one or more embedded systems. In some embodiments, one or more of these components, but not necessarily all of the components, may be considered and referred to as a processor based apparatus or system. In some embodiments, the use or inclusion of any of the components is optional. In some embodiments, the components communicate with each other via connections and/or communications channels 176, which may comprise wired connections, wireless connections, network connections, or a mixture or combination of both wired and wireless connections, communications channels, network connections, buses, etc.

The processor 162 may be used to execute or assist in executing the steps of the methods, schemes, and techniques described herein, and various program content, images, video, overlays, UIs, assets, virtual worlds, menus, menu screens, interfaces, graphical user interfaces (GUIs), windows, tables, graphics, avatars, characters, players, video games, simulations, etc., may be rendered on the display(s) 174. In some embodiments, the processor 162 executes code, software, or steps that implements the generation of visual representations of objects in three physical dimensions described above.

The memory 164 may include or comprise any type of computer readable storage or recording medium or media. In some embodiments, the memory 164 may include or comprise a tangible, physical memory. In some embodiments, the memory 164 may be used for storing program or computer code or macros that implements the methods and techniques described herein, such as program code for running the methods, schemes, and techniques described herein. In some embodiments, the memory 164 may serve as a tangible non-transitory computer readable storage medium for storing or embodying one or more computer programs or software applications for causing a processor based apparatus or system to execute or perform the steps of any of the methods, code, schemes, and/or techniques described herein. Furthermore, in some embodiments, the memory 164 may be used for storing any needed database(s).

In some embodiments, the wireless and/or wired network interface 166 may be used for accessing the network 168 for obtaining any type of information, such as for example any information needed for implementing, running, and/or executing the methods, techniques, processes, etc., discussed herein. The network 168 may comprise the Internet, a local area network, an intranet, a wide area network, or any other network.

In some embodiments, the wireless interface 170 may be used for wirelessly communicating with other devices, such as for example any of the devices, apparatuses, systems, etc., described herein.

In some embodiments, the input/output device interface 172 may be used for interfacing with any devices or peripherals, such as for example any of the devices, apparatuses, systems, etc., described herein.

The one or more displays 174 may comprises any type of display devices and may be used for implementing any needed environments. For example, in some embodiments one or more displays 174 may be included in a head worn device such as a headset, glasses-type user device, head-mounted display (HMD), or the like. In some embodiments the one or more displays 174 may be included or associated with any type of virtual reality (VR) device, augmented reality (AR) device, or mixed reality (MR) device. In some embodiments the one or more displays 174 may be included in a device such as a smartphone, tablet computer, pad-like computer, notebook computer, etc. In some embodiments the one or more displays 174 may be associated with any type of computer such as desktop computers, etc. The one or more displays 174 may comprise any type of display or display device or apparatus, using any type of display technology.

In some embodiments, one or more of the embodiments, methods, approaches, schemes, and/or techniques described above may be implemented in one or more computer programs or software applications executable by a processor based apparatus or system. By way of example, such processor based system may comprise a smartphone, tablet computer, VR, AR, or MR system, entertainment system, game console, mobile device, computer, workstation, desktop computer, notebook computer, server, graphics workstation, client, portable device, pad-like device, communications device or equipment, etc. Such computer program(s) or software may be used for executing various steps and/or features of the above-described methods, schemes, and/or techniques. That is, the computer program(s) or software may be adapted or configured to cause or configure a processor based apparatus or system to execute and achieve the functions described herein. For example, such computer program(s) or software may be used for implementing any embodiment of the above-described methods, steps, techniques, schemes, or features. As another example, such computer program(s) or software may be used for implementing any type of tool or similar utility that uses any one or more of the above described embodiments, methods, approaches, schemes, and/or techniques. In some embodiments, one or more such computer programs or software may comprise a VR, AR, or MR application, communications application, object positional tracking application, a tool, utility, application, computer simulation, computer game, video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods, schemes and/or techniques. In some embodiments, such computer program(s) or software may be stored or embodied in a non-transitory computer readable storage or recording medium or media, such as a tangible computer readable storage or recording medium or media. In some embodiments, such computer program(s) or software may be stored or embodied in transitory computer readable storage or recording medium or media, such as in one or more transitory forms of signal transmission (for example, a propagating electrical or electromagnetic signal).

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, schemes, and/or techniques described herein. For example, in some embodiments the present invention provides one or more non-transitory computer readable storage mediums storing one or more computer programs adapted or configured to cause a processor based apparatus or system to execute steps comprising any one or more of the steps involved in any one or more of the embodiments, methods, approaches, schemes, and/or techniques described herein.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:
   receiving a plurality of different views of a real-world object that were captured with a plurality of image capture devices; and
   generating a visual representation of the real-world object in three physical dimensions by displaying images on a transparent display device that continuously rotates completely around an axis of rotation;
   wherein the transparent display device comprises an output device;
   wherein the number of image capture devices used is at least partly based on a refresh rate of the transparent display device; and
   wherein the images displayed on the transparent display device are selected based on the plurality of different views of the real-world object.

2. The method of claim 1, wherein the generating a visual representation of the real-world object comprises:
   generating the visual representation of the real-world object in substantially real time with the capturing of the plurality of different views of the real-world object.

3. The method of claim 1, further comprising:
   transmitting data representing the plurality of different views of the real-world object over a computer network for use in the generating the visual representation of the real-world object in three physical dimensions.

4. The method of claim 1, wherein for each of a plurality of different positions of the transparent display device within a rotation, an image is displayed on the transparent display device that comprises a corresponding one of the plurality of different views of the real-world object.

5. The method of claim 1, wherein the plurality of image capture devices are arranged to encircle the real-world object.

6. The method of claim 1, wherein the plurality of image capture devices are equally spaced apart.

7. The method of claim 1, wherein the transparent display device continuously rotates completely around the axis of rotation at a constant rate.

8. A system, comprising:
   a network interface configured to receive data representing a plurality of different views of a real-world object that were captured with a plurality of image capture devices;
   a transparent display device configured to continuously rotate completely around an axis of rotation, wherein the transparent display device comprises an output device; and
   a processor based apparatus configured to generate a visual representation of the real-world object in three physical dimensions by displaying images on the transparent display device as it rotates, wherein the number of image capture devices used is at least partly based on a refresh rate of the transparent display device, and wherein the images displayed on the transparent display device are selected based on the plurality of different views of the real-world object.

9. The system of claim 8, wherein the processor based apparatus is further configured to generate the visual representation of the real-world object in substantially real time with the capturing of the plurality of different views of the real-world object.

10. The system of claim 8, wherein for each of a plurality of different positions of the transparent display device within a rotation, an image is displayed on the transparent display device that comprises a corresponding one of the plurality of different views of the real-world object.

11. The system of claim 8, wherein the plurality of image capture devices are arranged to encircle the real-world object.

12. The system of claim 8, wherein the plurality of image capture devices are equally spaced apart.

13. The system of claim 8, wherein the processor based apparatus is further configured to rotate the transparent display device completely around the axis of rotation at a constant rate.

14. A non-transitory computer readable storage medium storing one or more computer programs configured to cause a processor based system to execute steps comprising:
   receiving data representing a plurality of different views of a real-world object that are captured with a plurality of image capture devices; and generating a visual representation of the real-world object in three physical dimensions by displaying images on a transparent display device that continuously rotates completely around an axis of rotation;

wherein the transparent display device comprises an output device;

wherein the number of image capture devices used is at least partly based on a refresh rate of the transparent display device; and wherein the images displayed on the transparent display device are selected based on the plurality of different views of the real-world object.

15. The non-transitory computer readable storage medium of claim 14, wherein the generating a visual representation of the real-world object comprises:

generating the visual representation of the real-world object in substantially real time with the capturing of the plurality of different views of the real-world object.

16. The non-transitory computer readable storage medium of claim 14, wherein the receiving data representing a plurality of different views of a real-world object comprises:

receiving the data representing the plurality of different views of the real-world object via a computer network.

17. The non-transitory computer readable storage medium of claim 14, wherein for each of a plurality of different positions of the transparent display device within a rotation, an image is displayed on the transparent display device that comprises a corresponding one of the plurality of different views of the real-world object.

18. The non-transitory computer readable storage medium of claim 14, wherein the one or more computer programs are further configured to cause the processor based system to execute steps comprising:

rotating the transparent display device completely around the axis of rotation at a constant rate.

19. A method, comprising:

receiving a plurality of different views of a real-world object that were captured with a plurality of image capture devices; and generating a visual representation of the real-world object in three physical dimensions by displaying images on a transparent display device that continuously rotates completely around an axis of rotation;

wherein the transparent display device comprises an output device;

wherein a rate of rotation of the transparent display device is at least partly based on the number of image capture devices; and wherein the images displayed on the transparent display device are selected based on the plurality of different views of the real-world object.

20. The method of claim 19, wherein the rate of rotation of the transparent display device is set to a value in which a number of refresh positions of the transparent display device within a rotation is equal to the number of image capture devices.

* * * * *